Sept. 8, 1953 A. A. GRIFFITH 2,651,175
CONTROLLING COMBUSTION SYSTEM OF GAS TURBINE ENGINES
Filed Sept. 15, 1947 3 Sheets-Sheet 1
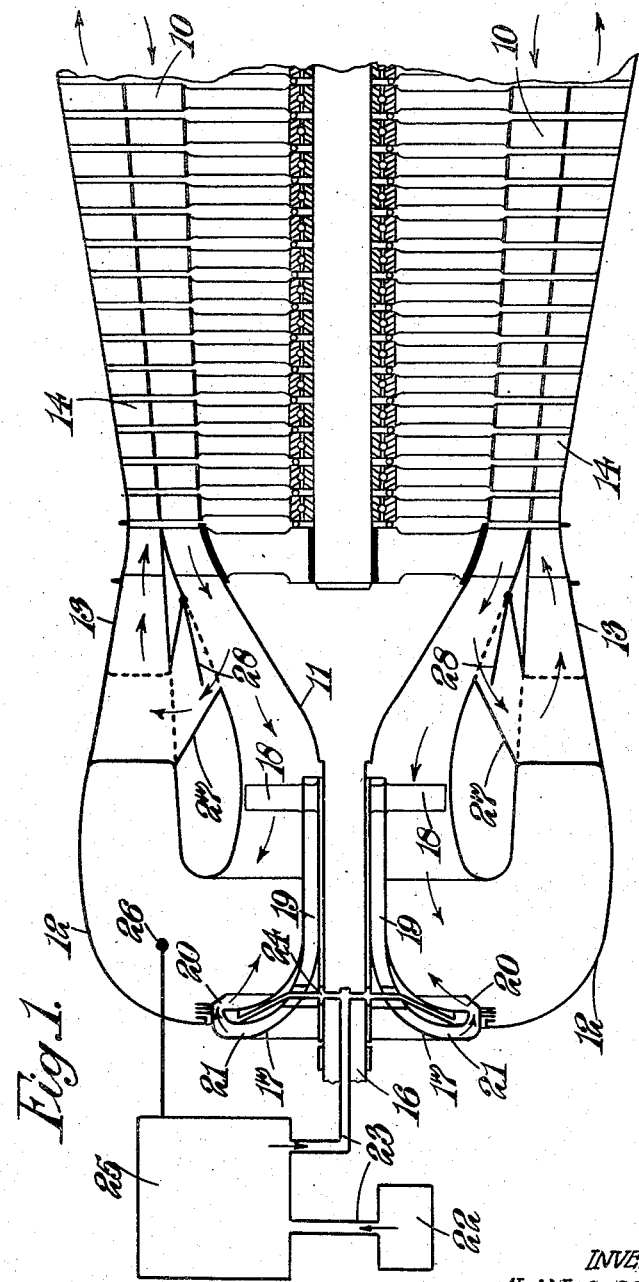
INVENTOR
ALAN A. GRIFFITH
by Wilkinson Mawhinney
ATTORNEYS

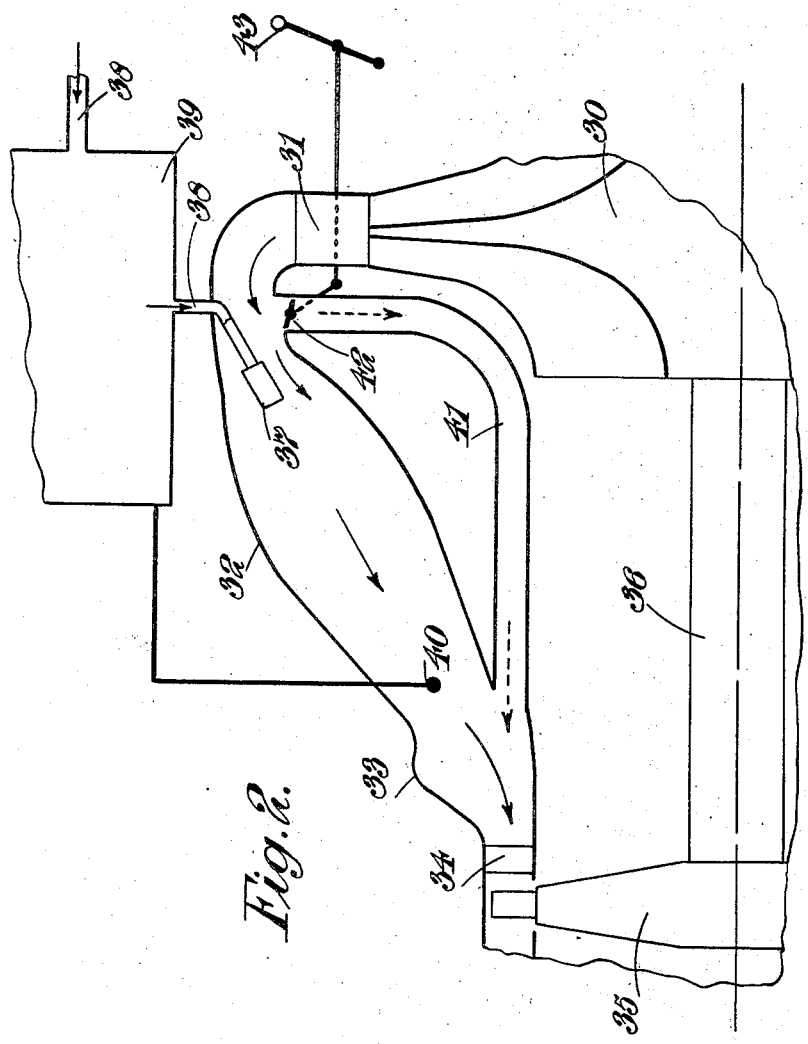

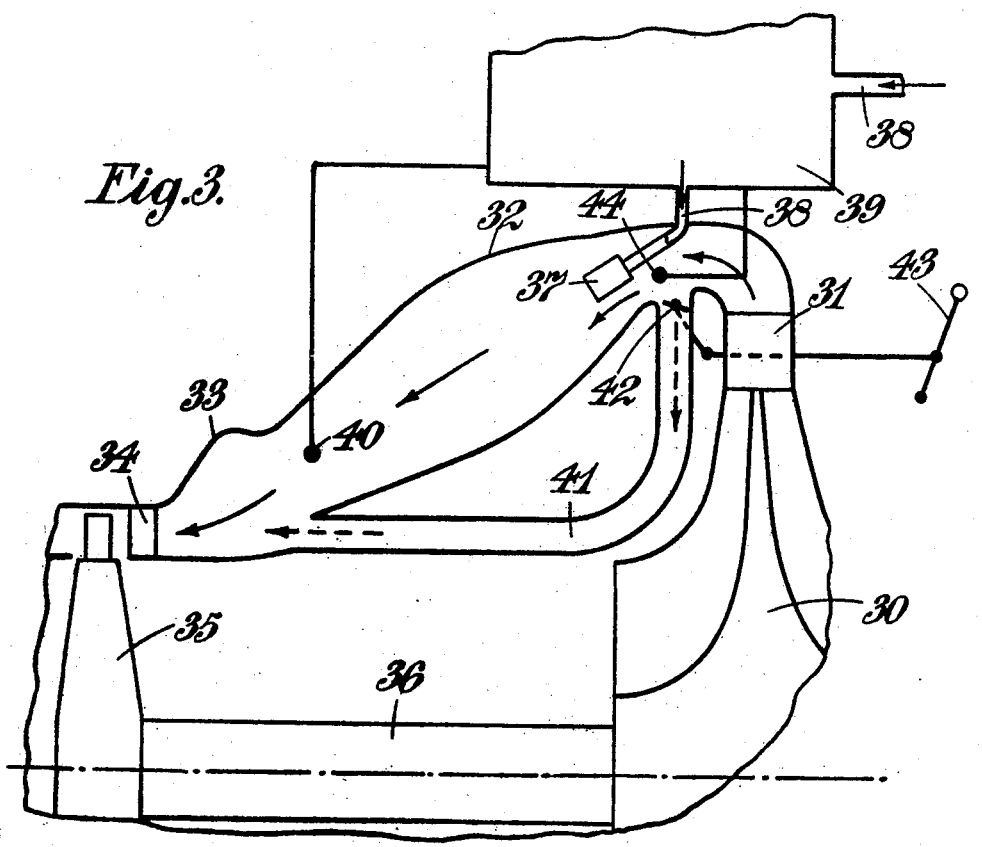

Patented Sept. 8, 1953

2,651,175

UNITED STATES PATENT OFFICE 2,651,175

CONTROLLING COMBUSTION SYSTEM OF GAS-TURBINE ENGINES

Alan Arnold Griffith, Derby, England, assignor to Rolls-Royce Limited, Derby, England, a British company Application September 15, 1947, Serial No. 774,114
In Great Britain September 11, 1946

Section 1, Public Law 690, August 8, 1946
Patent expires September 11, 1966

6 Claims. (Cl. 60—39.23)

This invention relates to gas-turbines and a particular application is to turbine-engines used in aircraft propulsion.

In present practice, gas-turbines are usually controlled by adjustment of the rate of fuel-supply only; it is necessary to provide a fairly wide range of mixture-strength to satisfy various operating conditions, and additionally, large variations of mixture-strength occur during rapid acceleration and deceleration giving rise to various disadvantages and increasing the difficulty in combustion chamber design. For example, in the case of gas-turbine aero-engines, difficulties have been encountered due to extinction of the flame during acceleration and subsequent difficulty in relighting, particularly in flight.

According to one feature of this invention, means controlling a gas-turbine comprises a by-pass to divert air from entering the combustion chamber and to mix it with the effluent gases therefrom, manually operated valve means controlling said by-pass, and thermostat means to control the rate of fuel-supply to the combustion-chamber to give a preselected rise of temperature in the combustion-chamber, that is a preselected rise of temperature between the inlet and outlet of the combustion chamber, or a preselected absolute temperature at or near the outlet.

The control means according to this invention is applicable to any type of combustion-chamber, and to any type of engine in which the power increases as a function of the temperature of admission to the turbine. A particular though not exclusive application is to gas-turbine engines used for aircraft propulsion, whereby a relatively wide range of normal operating conditions is called for, whilst in addition the control-system should be able of dealing with rapid accelerations and decelerations. It is particularly well adapted to the annular types of chamber with centrifugal atomisation, for which the attainment of an adequate range of stable burning is one of the principal problems. It is equally applicable however, to engines in which a number of separate combustion-chambers are used.

In the application of this invention to any type of gas-turbine, there is provided a by-pass passage which extends from the air-supply conduit, at a point before its communication with the combustion-chamber, to the outlet passage from the combustion-chamber through which the effluent gases pass to the turbine, and this by-pass is provided with a controlling valve which, in the preferred construction, is controlled by the operator, and this valve may constitute his only direct control of the engine.

The fuel-supply to the combustion chamber is automatically controlled by a thermostatic device situated at or near the outlet from the combustion-chamber, or within the combustion-chamber itself, so that it is responsive either to the temperature of the effluent gases from the combustion-chamber prior to their mixing with the by-passed air, or to the temperature-rise in the combustion-chamber. Broadly, the temperature-rise in the combustion-chamber is proportional to the mixture-strength, subject to variations arising from the change in the specific heat of air, partial dissociation of the combustion products taking place at very high temperatures or incomplete combustion at mixture-strengths differing considerably from that in which the chamber works most satisfactorily, but by controlling the mixture-strength as a function of the combustion-chamber temperature, stable combustion can be ensured.

The following description which has reference to the accompanying drawings, illustrates the application of this invention to two types of gas-turbine-engines.

In the drawings, Figure 1 is a diagrammatic illustration of a gas-turbine-engine of the type having an annular combustion chamber with centrifugal atomisation.

Figure 2 is a diagrammatic sectional illustration of a gas-turbine-engine having a series of separate combustion chambers, and Figure 3 is a view similar to Figure 2 showing a modification.

Referring to Figure 1, the engine comprises a turbine-compressor system in which the rotor includes a series of separate contra-rotating discs, each carrying both turbine and compressor blades. The compressor blades 10 deliver air through ducts 11 to an annular combustion chamber 12 in which fuel is burnt in the air and from which the combustion products admixed with the air are delivered through ducting 13 to the turbine blades 14 to drive them.

Mounted centrally within the combustion chamber 12, there is a centrifugal fuel atomiser comprising a stationary shaft 16 carrying a rotatable fuel distributor 17. The fuel distributor carries vanes 18 so that air entering the combustion chamber 12 drives it and a portion of the air flows through an annular passage 19 in the fuel distributor 17 to an annular outlet 20 of an annular distributor chamber 21 from a reservoir 22 through conduits 23, a feed space 24 between the shaft 16 and fuel distributor 17 and radial conduits 24 in the fuel distributor.

The fuel-flow to the combustion chamber 12 is varied by means of a thermostatically-controlled valve device 25, the thermostat device 26 being located within the combustion chamber 12, so as to be responsive to temperature-changes in the combustion chamber and to maintain a constant temperature within the chamber 12.

An air by-pass duct 27 connects the air inlet duct 11 with the outlet duct 13 and flap-valves 28 are provided to vary the quantity of air flowing through the by-pass duct 27, the flap-valves being operated by a control lever 29 operated by the pilot.

This arrangement is such that the engine operation is controlled by the quantity of air flowing through the combustion chamber 12.

Starting with the operator's by-pass valve 28 fully open, only part of the air-supply passes through the combustion chamber 12 where it is heated to the extent determined by the amount of fuel supplied which is in turn determined by the setting of the thermostat device 26. The effluent gases from the combustion chamber 12 are then mixed with air to produce the desired temperature for driving the turbine at its idling speed. When more power is required the valve 28 is partly closed and the immediate effect is that a larger proportion of air is directed through the combustion chamber 12. A reduction of the temperature therein immediately follows which causes the thermostat device 26 to increase the fuel supply to restore the air-fuel balance so that the combustion chamber 12 is working under the same temperature conditions but with more air and more fuel in the same proportion. The effluent gases are mixed with less by-passed air so that the temperature of admission to the turbine 14 is increased and it therefore accelerates.

When the valves 28 are fully shut the whole air-supply goes through the combustion chamber 12 and the temperature of admission to the turbine reaches the combustion chamber temperature as determined by the setting of the thermostat device 26. This is the full power condition of operation of the engine. The thermostat may be positioned either in the combustion chamber as described or at or near the outlet from the combustion where it will be subject to the influence of the temperature of the effluent gases just prior to mixing with the by-passed air.

In effect therefore, the control means of this invention functions to give a preselected absolute temperature of the effluent gases in the combustion chamber or at or near the outlet from the combustion chamber.

Referring now to Figure 2, the engine comprises a compressor 30 delivering air into a distribution chamber 31 from which the air flows to a series of combustion chambers 32 in which fuel is burnt in the air. The effluent gases from the combustion chamber pass through outlet nozzles 33 and a nozzle-guide vane assembly 34 to a turbine 35 to drive it. The turbine 35 drives the compressor 30 through a shaft 36. The combustion chambers are disposed in a ring around the shaft 36.

Fuel is supplied to the combustion chamber burners 37 through supply conduits 38 and the rate of flow of fuel to the burners is varied by a valve device 39 the operation of which is controlled by a thermostat device 40. The latter is located near the outlet from the combustion chambers so as to be affected by the temperature of the effluent gases and thereby controls the fuel-supply to maintain the effluent gases at a substantially constant temperature.

If it is desired to control the fuel flow to give a preselected rise of temperature between the inlet and the outlet from the combustion chambers 32, a pair of thermostat devices 40, 44 are provided, one near the combustion chamber inlet and one near the combustion chamber outlet. These thermostat devices 40, 44 are arranged to control the valve device 39 thereby to control the fuel flow to maintain a predetermined temperature rise between the inlet and outlet of the combustion chambers 32.

An air by-pass conduit 41 is connected between the inlet to the combustion chamber 32 and the outlet nozzles 33 and a control valve 42 actuated by the operator's control lever 43 is provided to vary the quantity of air flowing through the by-pass conduit 41 and thereby varying the quantity of air passing into the combustion chamber.

The operation of the engine is similar to that illustrated in Figure 1, with the valve 42 fully open, only part of the air flows through the combustion chambers 32 where it is heated to a temperature determined by the setting of the thermostat device 40 and the remainder of the air flows through the by-pass conduit 41 and is mixed with the effluent gases to produce the desired temperature to run the turbine at its idling speed.

As the valve 42 is closed, the proportion of air flowing through combustion chambers increases but the temperature at the outlet therefrom remains the same due to the action of the thermostat device and the proportion of air flowing through the by-pass conduit decreases so that the temperature of the gases entering the turbine increases, giving more power.

With the valve 42 fully closed, the whole of the air passes through the combustion chambers and is heated to the temperature determined by the setting of the thermostat. This is the full power condition of operation of the engine.

With the proposed system of control, the extreme range of transient mixture-strength, assuming that the operator's throttle-valve is moved so quickly that the thermostat has not time to operate, can be accurately calculated. The response by the thermostat however will usually take place sufficiently rapidly that the actual range of mixture strengths is somewhat narrower than the said extreme range, so that a margin of safety against accidental extinction is ensured. It has been found that the extreme range of mixture strengths under these conditions is somewhat narrower than the range actually needed to cover all operating conditions, and it can be arranged that, under steady running conditions, the mixture-strength is at all times within the range of satisfactorily efficient combustion.

If desired, an over-riding control operated by a turbine-driven governor can be used to provide against the possibility of any defect arising which effects the normal relationship between the speed and the combustion-temperature.

In combustion-chambers in which primary, secondary and may be tertiary air-inlets are provided, the air-control may be used to by-pass air appropriately from one or more of the inlets to maintain the mixture strength within desired limits.

I claim:

1. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply control valve, a by-pass conduit connected to receive compressed air from said compressor and connected to deliver the by-passed air to mix with heated air leaving said combustion chamber through its outlet, a turbine connected with the outlet from the combustion chamber and with the outlet end of the by-pass conduit to receive the mixture of by-passed air and heated air; valve means arranged for manual adjustment to control the ratio of the quantity of compressed air entering the combustion chamber to that entering the by-pass conduit, said valve means constituting the sole power-selecting control of the engine, and thermostat means arranged within the combustion chamber to respond to a temperature condition in the combustion chamber and arranged to adjust said fuel supply control valve to vary the supply of fuel to the combustion chamber to maintain said temperature condition in said combustion chamber.

2. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply control valve, a by-pass conduit connected to receive compressed air from said compressor and connected to deliver the by-passed air to mix with heated air leaving said combustion chamber through its outlet, a turbine connected with the outlet from the combustion chamber and with the outlet end of the by-pass conduit to receive the mixture of by-passed air and heated air; valve means arranged for manual adjustment to control the ratio of the quantity of compressed air entering the combustion chamber to the quantity of compressed air entering the by-pass conduit, said valve means constituting the sole power-selecting control of the engine, and thermostat means arranged within the combustion chamber adjacent the outlet thereof to respond to the temperature of the heated air leaving the combustion chamber and arranged to adjust said fuel supply control valve to maintain the temperature of the heated air leaving the combustion chamber substantially constant.

3. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply control valve, a by-pass conduit connected to receive compressed air from said compressor and connected to deliver the by-passed air to mix with heated air leaving said combustion chamber through its outlet, a turbine connected with the outlet from the combustion chamber and with the outlet end of the by-pass conduit to receive the mixture of by-passed air and heated air, valve means arranged for manual adjustment to control the ratio of the quantity of compressed air entering the combustion chamber to the quantity of compressed air entering the by-pass conduit, said valve means constituting the sole power-selecting control of the engine, and thermostat means comprising a pair of temperature-sensitive devices arranged within the combustion chamber the one adjacent the outlet from the combustion chamber to respond to the temperature of the heated air leaving the combustion chamber and the other adjacent the inlet to the combustion chamber to respond to the temperature of the air entering the combustion chamber, said temperature-sensitive devices being arranged in cooperation to control said fuel supply control valve to vary the fuel supply to the combustion chamber to maintain substantially constant the difference in the temperatures to which said temperature-sensitive devices respond.

4. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply conduit, thermostat means adapted to respond to a temperature condition of the air heated in said combustion chamber, means including a valve device in said fuel supply conduit responsive to the temperature sensed by said thermostat device and operative to vary the fuel supply to maintain substantially constant the temperature condition of the heated air, a by-pass conduit connected to receive compressed air from said compressor and having an outlet therefrom, a turbine connected with the outlet from the combustion chamber and with the outlet of the by-pass conduit to receive a mixture of by-passed air and heated air, and valve means arranged for manual adjustment to control the ratio of the quantity of compressed air entering the combustion chamber to the quantity of compressed air entering the by-pass conduit said valve means constituting the sole power-selecting control of the engine.

5. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply conduit, thermostat means positioned in said combustion chambers at its outlet to be subjected to the temperature of the heating air leaving the combustion chamber, means including a valve device in said fuel supply conduit responsive to the temperature sensed by said thermostat device and operative to vary the fuel supply to maintain substantially constant the temperature of the heated air leaving the combustion chamber, a by-pass conduit connected to receive compressed air from said compressor and having an outlet therefrom, a turbine connected with the outlet from the combustion chamber and with the outlet of the by-pass conduit to receive a mixture of by-passed air and heated air, and valve means arranged for manual adjustment to control the ratio of the quantity of compressed air entering the combustion chamber to the quantity of compressed air entering the by-pass conduit, said valve means constituting the sole power-selecting control of the engine.

6. A gas-turbine engine comprising a compressor, a combustion chamber having an inlet connected to receive compressed air from said compressor and having an outlet therefrom, fuel supply means arranged to deliver fuel to said combustion chamber to heat the air flowing therein and including a fuel supply conduit, a pair of thermostat devices positioned in said combustion chamber, one of said thermostat devices being arranged adjacent the inlet thereof to respond to the temperature of the air entering the combustion chamber and the other being arranged adjacent the outlet to respond to the temperature of the heated air leaving the combustion chamber, means including a valve device in said fuel supply conduit responsive to the temperature sensed by said thermostat device and operative to vary the fuel supply to maintain substantially constant the difference of the temperature sensed by the thermostat devices, a by-pass conduit connected to receive compressed air from said compressor and having an outlet therefrom, a turbine connected with the outlet from the combustion chamber and with the outlet of the by-pass conduit to receive a mixture of by-passed air and heated air, and valve means arranged for manual adjustment to control the ratio of the quantity of compressed air entering the combustion chamber to the quantity of compressed air entering the by-pass conduit, said valve means constituting the sole power-selecting control of the engine.

ALAN ARNOLD GRIFFITH.

References Cited in the file of this patent

UNITED STATES PATENTS

| Number | Name | Date |
| --- | --- | --- |
| 972,504 | Brown | Oct. 11, 1910 |
| 2,011,420 | Samuelson | Aug. 13, 1935 |
| 2,095,991 | Lysholm | Oct. 19, 1937 |
| 2,131,781 | Lysholm | Oct. 4, 1938 |
| 2,227,666 | Noack | Jan. 7, 1941 |
| 2,336,232 | Doran | Dec. 7, 1943 |
| 2,390,959 | Pfenninger | Dec. 11, 1945 |
| 2,482,394 | Wyman | Sept. 20, 1949 |
| 2,499,232 | Strub | Feb. 28, 1950 |
| 2,547,093 | Ray | Apr. 3, 1951 |